United States Patent [19]

Leonard et al.

[11] Patent Number: 4,819,016

[45] Date of Patent: Apr. 4, 1989

[54] PHOTOGRAPHIC CAMERA

[75] Inventors: Bruce A. Leonard, Honeoye Falls, N.Y.; James S. Couch, Powell; Robert W. Mervar, Columbus, both of Ohio

[73] Assignee: Eastman Kodak Company, Rochester, N.Y.

[21] Appl. No.: 168,814

[22] Filed: Mar. 16, 1988

[51] Int. Cl.$^4$ .................. G03B 17/02; G03B 29/00
[52] U.S. Cl. ..................... 354/82; 354/145.1; 354/266; 354/288; 354/293; 352/243
[58] Field of Search ............. 354/82, 266, 293, 288, 354/126, 145.1; 352/243; 358/229

[56] References Cited

U.S. PATENT DOCUMENTS 4,208,113 6/1980 Prochnow .......................... 354/82
4,692,807 9/1987 Kee ...................................... 358/229

FOREIGN PATENT DOCUMENTS 934033 8/1963 United Kingdom ................ 354/293

Primary Examiner—A. A. Mathews
Attorney, Agent, or Firm—Roger A. Fields

[57] ABSTRACT

A handgrip is adapted to be connected selectively to either one of two opposite sides of a camera body. The handgrip is secured in fixed relation to the camera body to prevent relative movement between the two. A manually operated shutter release member is arranged on the camera body at a location substantially midway between its two opposite sides. The handgrip is configured to enable one-hand holding of the camera body and the same hand operation of the shutter release member. Since the shutter release member is substantially centered between the two opposite sides of the camera body, alternative right-hand or left-hand operation of the release member is possible in accordance with whichever side of the camera body the handgrip is secured to.

7 Claims, 4 Drawing Sheets

PHOTOGRAPHIC CAMERA

CROSS-REFERENCE TO A RELATED APPLICATION

Reference is made to commonly assigned, copending U.S. application Ser. No. 169,185 entitled PHOTOGRAPHIC CAMERA and filed Mar. 16, 1988 in the names of Bruce A. Leonard, James S. Couch, and Robert W. Mervar.

BACKGROUND OF THE INVENTION

1. Field of the Invention

The invention relates generally to photographic cameras, and more particularly to an improved camera which is capable of alternative right-hand or left-hand operation.

2. Description Relative to the Prior Art

It is well known to provide a photographic camera with a detachable handgrip which is grasped to hold the camera body steady when a shutter release button on the camera body is manually depressed to initiate picture-taking. Typically, this operation requires the use of both hands of the photographer. One hand is used to grasp the handgrip, and the other hand is used to depress the release button. Moreover, the arrangement does not lend itself to alternative right-hand or left-hand operation.

Often, as disclosed in U.S. Pat. No. 4,208,113, issued June 17, 1986, the handgrip includes a built-in shutter release button which, in contrast to locating the release button on the camera body, permits the same hand that holds the camera body steady (by grasping the handgrip) to depress the release button. Typically, this type of handgrip has the disadvantage that the handgrip can only be secured to one side of the camera body because of the need to couple the release button with a corresponding mechanism, such as a release plunger, inside of the camera body. As a result, alternative right-hand or left-hand operation is not usually possible. However, in U.S. Pat. No. 4,208,113, it is suggested that the handgrip be made pivotable about a pivot axis that extends substantially at right angles to the optical axis of the camera lens. This permits the handgrip to be secured to either side of the camera body since the handgrip can be pivoted in each instance to locate the release button in an upright position. As a result, alternative right-hand or left-hand operation is made possible. The disadvantage is that separate mechanisms are needed to couple with the release button in accordance with whichever side of the camera body the handgrip is secured to. Also, arresting means may be needed to prevent undesired and uncontrolled movements of the camera body and the handgrip relative to one another.

SUMMARY OF THE INVENTION

The above-described problems relating to prior art cameras having detachable handgrips are believed to be solved by the invention.

According to the invention a handgrip is adapted to be connected selectively to either one of two opposite sides of a camera body. The handgrip is secured in fixed relation to the camera body to prevent relative movement between the two. A manually operated shutter release member is arranged on the camera body at a location substantially midway between its two opposite sides. The handgrip is configured to enable one-hand holding of the camera body and the same hand operation of the shutter release member. Since the shutter release member is substantially centered between the two opposite sides of the camera body, alternative right-hand or left-hand operation of the release member is possible in accordance with whichever side of the camera body the handgrip is secured to.

THE CROSS-REFERENCED APPLICATION

The commonly assigned U.S. application cross-referenced above is directed to the appearance design of a preferred embodiment of the invention.

DETAILED DESCRIPTION OF THE PREFERRED EMBODIMENT

The invention is disclosed as being embodied preferably in a 35 mm camera. Because the features of this type of camera are well known, the description which follows is directed in particular to photographic elements forming part of or cooperating directly with the disclosed embodiment. It is understood, however, that other elements not specifically shown or described may take various forms known to persons of ordinary skill in the art.

Figure 1:
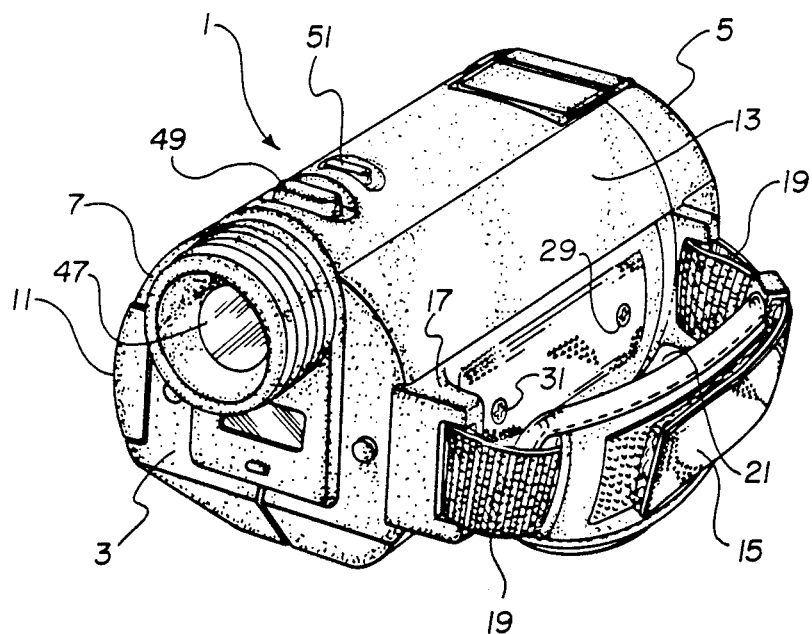
FIG. 1 is a rear perspective view of an improved camera in accordance with the preferred embodiment of the invention.
Figure 2:
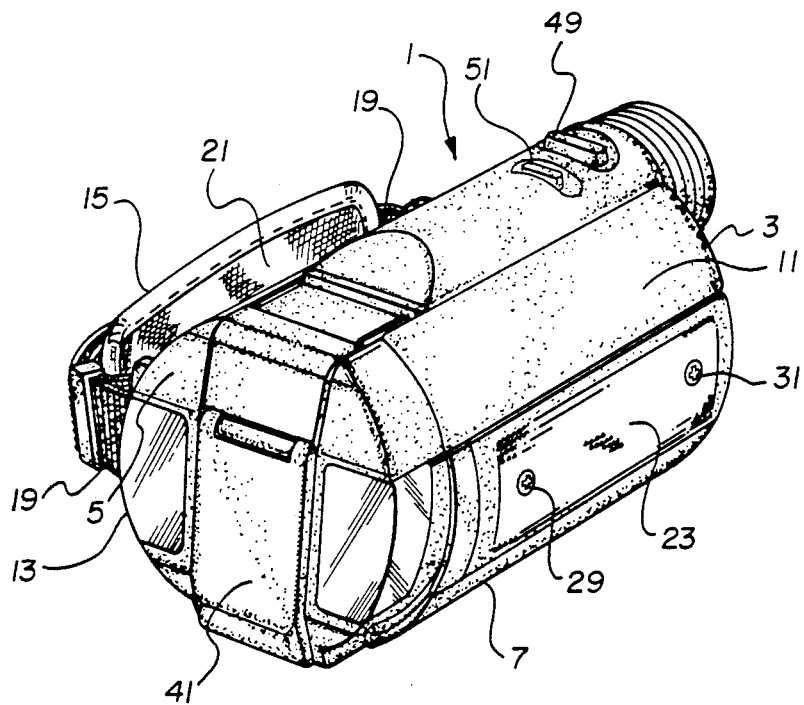
FIG. 2 is a front perspective view of the improved camera, showing an integral flash unit and lens cover in a folded position.
Figure 3:
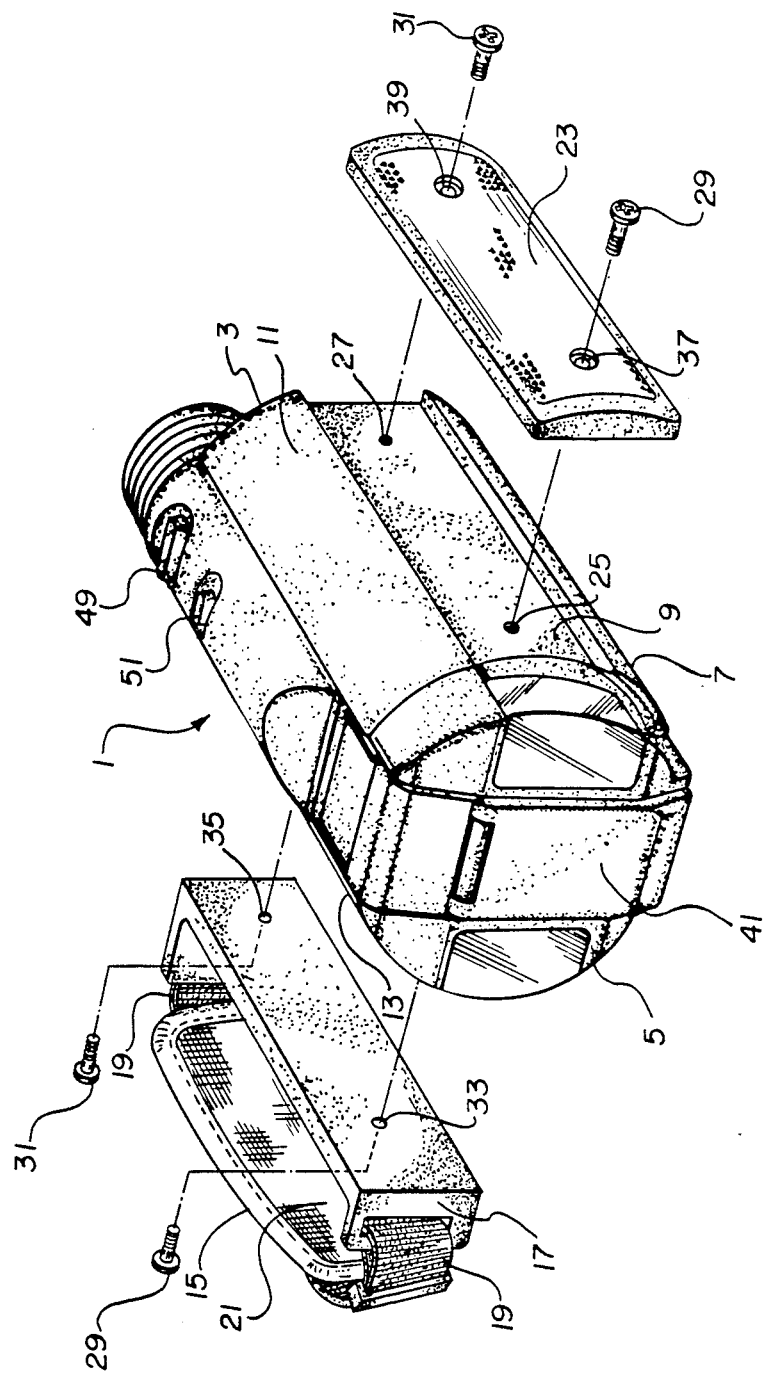
FIG. 3 is a front perspective view of the improved camera as in FIG. 2, showing a removable handgrip and a removable decorative face plate exploded from the camera body.

Referring now to the drawings, FIGS. 1 and 2 illustrate a photographic camera 1 as viewed from a rear face 3 and a front face 5, respectively, of the camera body 7. The camera body 7 includes a pair of identical recesses 9 (only one shown) formed in respective opposite sides 11 and 13 of the camera body. See FIG. 3. A handgrip 15 comprises a rigid base portion 17 shaped to fit snugly into each one of the two recesses 9 and an adjustable flexible strap portion 19 coupled to the rigid base portion to thereby define an open space 21 sufficiently dimensioned to alternatively receive ones right hand or left hand. When the rigid base portion 17 is fit into either recess 9, it substantially conforms with the contour of the camera body 7. The remaining recess 9 receives a decorative face plate 23 which, like the rigid base portion 17, substantially conforms with the contour of the camera body 1. As can be appreciated from FIG. 3, the two recesses 9 each include a pair of threaded wells 25 and 27 for receiving respective screws 29 and 31 (only two shown). One pair of the screws 25 and 27 extend through corresponding holes 33 and 35 in the rigid base portion 17 and the other pair of screws extend through corresponding holes 37 and 39 in the face plate 23 to secure the rigid base portion and the face plate fixedly to the two opposite sides 11 and 13 of the camera body 7. To switch the handgrip 15 and the face plate 23, each from the other recess 9, it is a simple matter to remove the four screws 25 and 27, make the exchange, and replace the screws.

Figure 4:
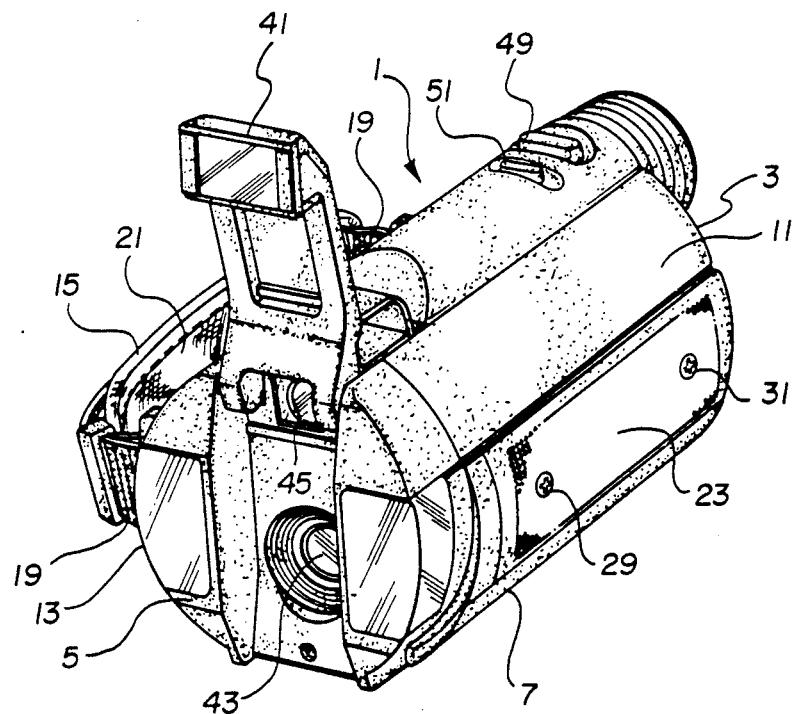
FIG. 4 is a front perspective view of the improved camera, showing an integral flash unit and lens cover in an erect position.

The photographic camera 1 includes an integral flip-up lens cover and electronic flash unit 41 which is pivotally mounted on the camera body 7 at its front face 5. The flip-up lens cover and flash unit 41 is movable between an erect position, illustrated in FIG. 4, in which it uncovers a taking lens 43 and a front viewfinder window 45, and a folded position, illustrated in FIG. 2, in which it covers the lens and the window. Both the taking lens 43 and the front viewfinder window 45 are located substantially midway between the two opposite sides 11 and 13 of the camera body 7. Similarly, a rear viewfinder window 47, shown in FIG. 1, is located substantially midway between the two opposite sides 11 and 13 of the camera body 7. Thus, regardless of which side 11 or 13 the handgrip 15 is secured to, alternative right-eye or left-eye use of the rear viewfinder window 47 is simplified.

A manually operated shutter release button 49 and a manually operated flash control button 51, such as for fill-flash, are arranged on a top portion 53 of the camera body 7. As shown in FIGS. 1 and 2, the shutter release button 49 and the flash control button 51 are each located substantially midway between the two opposite sides 11 and 13 of the camera body 7, and therefore they extend in line substantially parallel to the optical axis (not shown) of the taking lens 43.

OPERATION

The handgrip 15 by means of its rigid base portion 17 and its flexible strap portion 19 enables one-hand holding of the camera body 7 and the same hand operation of the shutter release button 49 and the flash control button 51. Since the shutter release button 49 and the flash control button 51 are substantially centered between the two opposite sides 11 and 13 of the camera body 7, alternative right-hand or left-hand operation of the two buttons is possible in accordance with whichever side of the camera body the handgrip 15 is secured to.

The invention has been described with reference to a preferred embodiment. However, it will be appreciated that modifications and variations can be effected within the ordinary skill in the art without departing from the scope of the invention.

We claim:

1. An improved photographic camera of the type wherein (a) a manually operated shutter release member is located on the camera body and (b) a handgrip is secured to one of two opposite sides of said camera body to hold the camera body steady during manual operation of said shutter release member, and wherein the improvement comprises:

said handgrip includes grip means for enabling one-hand holding of said camera body and the same hand operation of said shutter release member;

securing means is adapted to be connected alternatively to either one or the other of said two opposite sides of the camera body for securing said grip means in fixed relation to only one of the two sides at a time; and said shutter release member is arranged substantially midway between said two opposite sides of the camera body to permit alternative right-hand or left-hand operation of the shutter release member in accordance with whichever one side of the camera body said grip means is secured to.

2. An improved photographic camera as recited in claim 1, further wherein a viewfinder window is located on said camera body, and wherein the improvement further comprises:

said viewfinder window is arranged substantially midway between said two opposite sides of the camera body.

3. An improved photographic camera as recited in claim 1 or 2, further wherein said camera body houses a taking lens having an optical axis and a manually operated flash control member is located on the camera body, and wherein the improvement further comprises:

said taking lens is arranged substantially midway between said two opposite sides of the camera body to similarly locate said optical axis; and said shutter release member and said flash control member are arranged in line substantially parallel to said optical axis.

4. An improved photographic camera as recited in claim 1, wherein said camera body includes respective identical recesses in its two opposite sides, and wherein said grip means includes a rigid portion shaped to fit into each one of said recesses and a flexible portion coupled to said rigid portion to define an open space between said flexible portion and the rigid portion sufficiently dimensioned to alternatively receive ones' right hand or left hand.

5. An improved photographic camera as recited in claim 4, wherein said rigid portion and said flexible portion of the grip means have the same general appearance when viewed from the front or rear of said photographic camera regardless of which one of said two opposite sides of the camera body said grip means is secured to.

6. An improved photographic camera as recited in claim 4, wherein said rigid portion of the grip means is shaped to substantially conform with the contour of said camera body when the rigid portion is fit into either one of said recesses in the camera body.

7. An improved photographic camera as recited in claim 6, wherein the improvement further comprises:

a face plate shaped to fit into each one of said recesses in the camera body and to substantially conform with the contour of the camera body when said face plate is fit into whichever one of the recesses said rigid portion of the grip means is not fit into.

* * * * *